United States Patent [19]

Rosenberg et al.

[11] 4,398,959
[45] Aug. 16, 1983

[54] MORTAR TOPPING WITH CALCIUM NITRITE

[75] Inventors: Arnold M. Rosenberg, Potomac; James M. Gaidis, Ellicott City; Howard J. Troffkin, Potomac, all of Md.

[73] Assignee: W. R. Grace & Co., New York, N.Y.

[21] Appl. No.: 352,292

[22] Filed: Feb. 25, 1982

Related U.S. Application Data

[63] Continuation-in-part of Ser. No. 254,236, Apr. 15, 1981, abandoned.

[51] Int. Cl.$^3$ .............................................. C04B 7/35
[52] U.S. Cl. ....................................... 106/90; 106/98; 106/314
[58] Field of Search ................... 106/90, 98, 314, 315

[56] References Cited

U.S. PATENT DOCUMENTS 3,427,175 2/1969 Angstadt et al. ................... 106/315
3,997,353 12/1976 Chervenka et al. ................. 106/90
4,285,733 8/1981 Rosenberg et al. ................. 106/98

*Primary Examiner*—James Poer
*Attorney, Agent, or Firm*—Howard J. Troffkin

[57] ABSTRACT

Reinforced concrete structures often suffer corrosion damage. This damage is repaired by removing the layer of distressed concrete around the metal reinforcement and filling in the removed area with a high content calcium nitrite-containing cement based composition.

10 Claims, No Drawings

MORTAR TOPPING WITH CALCIUM NITRITE

This is a continuation-in-part application of copending U.S. application Ser. No. 254,236, filed Apr. 15, 1981, now abandoned.

The invention is applicable not only to metal reinforced bridges, but also to substantially any metal reinforced concrete structures. This includes reinforced concrete pillars, vertical walls such as are found in swimming pools (frequently applied by "Gunite" procedures); concrete and/or mortar as applied to chicken-wire structures and/or hardware cloth structures, typically those found in amusement parks, and the like. All such structures are subject to some extent to spalling in the vicinity of the metal reinforcing, and can be conveniently repaired by the process of this invention.

The cement mixes of this invention are new. The calcium nitrite as such has been used in cement mixes prior to this invention, but so far as is known not in the concentrations necessary to produce the double salt calcium nitrite-calcium hydroxide. Our cement mixes require a concentration of calcium nitrite, which is at least 20% by weight, based on the water content of the mix. Concentrations below this amount will not form the double salt. Concentrations in excess of 30%, based on water, may be used, but offer no economic advantage. A typically useful range is 20 to 30% based on water. The calcium hydroxide component of the double salt will be derived either from the calcium oxide content of the hydraulic cement component, or from added lime, or both. It appears that this double salt forms in what would otherwise be pores within the set cement or mortar. Such formation greatly reduces permeability of the set composition, thereby inhibiting intrusion of chloride ions into the interior of the mix, thereby in turn preventing their contacting the steel surfaces of the reinforcing elements, with consequent inhibition of corrosion.

Since the amount of calcium nitrite required depends on the amount of water in the cement based mix (it must be at least 20% by weight of the water), increasing the amount of water will require an increased amount of calcium nitrite. Conversely, reduction in the amount of water (as, e.g., by use of a conventional water reducing agent) will permit use of a reduced amount of calcium nitrite.

As the term "corrosion" is used, i.e., it applies not only to concrete, which is weakened by intrusion of chloride, but also to the corrosion of the metallic reinforced elements by formation of rust and the like. The use of this invention discourages both types of corrosion.

The calcium nitrite containing cement based mixes of this invention are conventional mortars (i.e. mix of cement, sand, water) or concretes (i.e. mix of cement, sand, aggregate of up to about 0.5 inch diameter, water) except for their high content of calcium nitrite. The mortars and concretes may contain conventional cement admixtures, such as water reducing agents or latex emulsions (such as styrene/butadiene, vinyl chloride or vinylidene chloride normally used in equal parts to the water). The following table gives the composition of two embodiments, one with no lime and one with lime; plus a range of components.

Mortar Mixes of the Invention

| Component | Ex. 1 Preferred, no lime | Preferred, with lime | Broad Operable Range | |
|---|---|---|---|---|
| Cement | 10 | 10 | 5 | to 20 |
| Sand | 20 | 20 | 10 | to 40 |
| Water | 5 | 5 | 2 | to 10 |
| $Ca(NO_2)_2$ | 1 | 1 | 0.5 | to 4[1] |
| Lime | 0 | 0.1–0.5 | 0 | to 1 |
| Aggregate | | | 0 | to 50 |
| Latex | | | 0 | to 10 |

[1] The $Ca(NO_2)_2$ should be at least 20% by weight of the water.

EXAMPLE 2

A reinforced concrete bridge was found to be chloride-corroded in several areas. One of the areas, about 2 feet by 6 feet, was scarified by removing the affected concrete down to a depth of about two inches. This exposed some of the reinforcing bars. These were sand blasted to present a clean surface. A mortar mix was then prepared in accordance with Example 1 in the above table. This mortar was applied to the scarified area and allowed to set for 24 hours. Thereafter traffic was permitted to resume on the bridge. This mortar replacement proved to be durable and impervious to further chloride deterioration. Formation of the double salt, calcium nitrite-calcium hydroxide, was believed to fill the pores of the mortar which otherwise would permit seepage of chloride through the layer.

What is claimed is:

1. A method of inhibiting corrosion of concrete structure containing metal reinforcement elements therein comprising removing a layer of concrete from said concrete structure and refilling the removed area of concrete structure with a cement based composition consisting essentially of, in parts by weight, about 5 to 20 parts hydraulic cement, about 10 to 40 parts sand, about 2 to 10 parts water, about 0 to 1 part lime, about 0 to 50 parts aggregate of up to about 0.5 inch diameter, about 0 to 10 parts latex and about 0.5 to 4 parts calcium nitrite, the calcium nitrite being in at least 20 percent by weight of the water content.

2. The method of claim 1 wherein the layer of concrete removed from said concrete structure contains damaged concrete.

3. The method of claim 2 wherein the layer of concrete removed is of a depth to substantially expose some of the reinforcement elements.

4. The method of claim 1, 2 or 3 wherein the lime content of the cement based composition is from 0.1 to 0.5 parts by weight.

5. The method of claim 1, 2 or 3 wherein the cement based composition consists essentially of, in parts by weight, about 1 part cement, about 2 parts sand, about 0.5 parts water, about 0.1 part calcium nitrite and from 0.1 to 0.5 part lime.

6. The method of claim 1, 2, 3 or 4 wherein the cement based composition contains about 2 to 10 parts latex of styrene-butadiene or of vinylidene chloride.

7. The method of claim 1, 2, 3 or 4 wherein the cement based composition contains 10 to 50 parts aggregate of about 0.3 to 0.5 inch diameter.

8. A concrete structure capable of inhibiting corrosion comprising
   (a) a concrete structure containing metal reinforcement elements therein; said structure being free of calcium nitrite, and
   (b) a layer of cement based composition applied over the exposed surface of the concrete structure (a); said cement based composition formed from a mixture consisting essentially of, in parts by weight, about 5 to 20 parts hydraulic cement, about 10 to 40 parts sand, about 2 to 10 parts water, about 0 to 1 part lime, about 0 to 50 parts aggregate of up to about 0.5 inch diameter, about 0 to 10 parts latex and about 0.5 to 4 parts calcium nitrite, the calcium nitrite being in at least 20 percent by weight of the water content.

9. The structure of claim 8 wherein the cement based composition (b) is formed with from 0.1 to 0.5 part lime.

10. The structure of claim 8 wherein the cement based composition (b) is formed with from 2 to 10 parts latex of styrene-butadiene or of vinylidene chloride.

* * * * *